Figure 1:
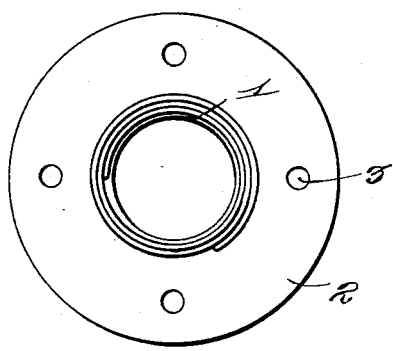

(No Model.)

C. H. MERWARTH.
PACKING FOR STEAM AND HYDRAULIC JOINTS.

No. 591,863. Patented Oct. 19, 1897.

WITNESSES

INVENTOR
Charles H. Merwarth,
By John Shedderburn
Attorney

UNITED STATES PATENT OFFICE.

CHARLES H. MERWARTH, OF SOUTH BETHLEHEM, PENNSYLVANIA.

PACKING FOR STEAM AND HYDRAULIC JOINTS.

SPECIFICATION forming part of Letters Patent No. 591,863, dated October 19, 1897.

Application filed January 26, 1897. Serial No. 620,765. (No model.)

*To all whom it may concern:*

Be it known that I, CHARLES H. MERWARTH, a citizen of the United States, residing at South Bethlehem, in the county of Northampton and State of Pennsylvania, have invented certain new and useful Improvements in Packing for Steam and Hydraulic Joints; and I do hereby declare the following to be a full, clear, and exact description of the invention, such as will enable others skilled in the art to which it appertains to make and use the same.

This invention relates to packing for steam and hydraulic joints, and has for its object to provide a substitute for the ordinary fibrous and rubber packings, which shall be superior in every way thereto and which will be capable of sustaining many times the pressure of which the ordinary packings are susceptible.

To this end the invention consists in an improved packing embodying certain novel features and details of construction, as hereinafter fully described, illustrated in the drawings, and incorporated in the claim.

Figure 2:
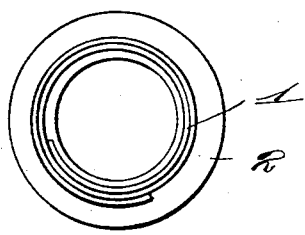
Figure 3:
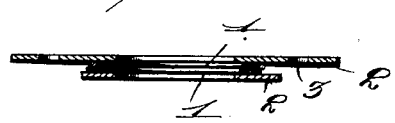

In the accompanying drawings, forming a part of this specification, Figure 1 is a plan view of one surface to which one portion of the packing is applied. Fig. 2 is a similar view of the opposing portion of the joint, showing the complementary portion of the packing; and Fig. 3 is a sectional view through the joint.

Similar numerals of reference designate corresponding parts in the several figures of the drawings.

The improved packing is composed of one or more pieces or sections, each of which consists of a piece of copper or other soft wire, (indicated at 1.) The wire may be either round, flat, or otherwise in short section and is applied to the surface in evolute or involute coils, and both of the surfaces or objects to be joined are similarly provided with these coils of soft wire or metal strips. The coils of one portion of the packing also correspond approximately in size to the coils of the other portion of the packing and, if desired, one portion of the packing may be coiled in a reverse direction from the other portion, so that the coils of one portion will intermesh in a manner similar to screw-threads with the coils of the other portion of the packing.

The surfaces or objects to be united by a steam or water tight joint, and indicated at 2, may be provided with openings 3 for adapting the surfaces of objects to be bolted firmly together. The coils of soft wire may be soldered to their respective surfaces or objects or be secured thereto in any convenient manner. When heavy pressure is brought to bear upon the opposing portions of the packing, the several coils thereof are caused not only to intermesh with each other but to mash or flatten each other, and the greater the pressure applied the tighter will be the joint. A thoroughly homogeneous joint is thus provided, and it will be understood that a joint of this nature is susceptible of a much higher degree of pressure than the ordinary fibrous or gum packing in common use.

Having thus described my invention, what I claim as new, and desire to secure by Letters Patent, is—

A packing for joints, consisting of two strips of soft metal coiled in involute form as described and secured to the opposing surfaces to be joined, the coils of one portion being adapted to intermesh with the coils of the opposing portion, substantially as and for the purpose described.

In testimony whereof I have signed this specification in the presence of two subscribing witnesses.

CHARLES H. MERWARTH.

Witnesses:
 JAMES H. STROMAN,
 J. HARRY KRESGE.